United States Patent
Kraft et al.

(10) Patent No.: US 8,116,826 B2
(45) Date of Patent: Feb. 14, 2012

(54) METHODS, APPARATUSES AND COMPUTER PROGRAM PRODUCTS FOR AUTOMATIC ADJUSTMENT OF CALL AND MESSAGE ALERT LEVELS FOR MISSED/REJECTED CALLS/MESSAGES

(75) Inventors: Christian Kraft, Frederiksberg C (DK); Peter Dam Nielsen, Kgs. Lyngby (DK)

(73) Assignee: Nokia Corporation, Espoo (FI)

( * ) Notice: Subject to any disclaimer, the term of this patent is extended or adjusted under 35 U.S.C. 154(b) by 999 days.

(21) Appl. No.: 11/771,469

(22) Filed: Jun. 29, 2007

(65) Prior Publication Data

US 2009/0002127 A1 Jan. 1, 2009

(51) Int. Cl.
*H04M 1/00* (2006.01)
(52) U.S. Cl. ........... 455/567; 455/412.2; 455/401; 379/106.09; 379/179; 379/207.08; 379/207.16; 379/252; 379/376.02; 379/418; 379/421; 379/373.01; 379/373.02
(58) Field of Classification Search ............... 455/412.2
See application file for complete search history.

(56) References Cited

U.S. PATENT DOCUMENTS

| | | | | |
|---|---|---|---|---|
| 6,246,761 | B1 * | 6/2001 | Cuddy | 379/418 |
| 6,529,742 | B1 * | 3/2003 | Yang | 455/556.1 |
| 6,751,485 | B2 * | 6/2004 | Ranta | 455/567 |
| 7,392,066 | B2 * | 6/2008 | Haparnas | 455/567 |
| 7,558,384 | B2 * | 7/2009 | Tischer | 379/373.02 |
| 2006/0135204 | A1 * | 6/2006 | Angelhag | 455/557 |
| 2007/0281750 | A1 * | 12/2007 | Cox et al. | 455/567 |

\* cited by examiner

*Primary Examiner* — Justin Lee
(74) *Attorney, Agent, or Firm* — Alston & Bird LLP

(57) ABSTRACT

A device for intelligently adjusting a volume level for call/message alerts includes a processor, an interface(s), a memory, a timer and a volume adjuster. The processor receives a call(s)/message(s) and causes the memory to store data associated with the call(s)/message(s). The processor invokes a timer and instructs a ringer to generate a call/message alert. The processor receives an additional call(s)/message(s) and determines if these calls/messages are sent from the same user of an electronic device as a previous call/message within a time period. If a previous call/message was missed by a user of a terminal, the processor causes a ringer to increase the volume of a subsequent call/message sent from the user of the electronic device. If a previous call/message was rejected by a user of a terminal, the processor causes the ringer to decrease the volume of a subsequent call/message sent from the user of the electronic device.

30 Claims, 6 Drawing Sheets

METHODS, APPARATUSES AND COMPUTER PROGRAM PRODUCTS FOR AUTOMATIC ADJUSTMENT OF CALL AND MESSAGE ALERT LEVELS FOR MISSED/REJECTED CALLS/MESSAGES

FIELD OF THE INVENTION

Embodiments of the present invention relate generally to intelligently adjusting the volume level for incoming call alerts and message alerts, and more particularly, relate to a method, device, mobile terminal and computer program product for increasing/decreasing the ringing volume of a terminal on the basis of missed and rejected call alerts as well as message alerts.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One such expansion in the capabilities of mobile electronic devices relates to techniques of alerting or notifying a user of incoming calls and/or messages. Typically, a user may set or adjust the volume level of his/her mobile device, such as a mobile phone, to a desirable level such that incoming calls may be heard prior to answering the call(s) and so that a call(s) will not be inadvertently missed. However, many users forget to adjust their volume settings based on their surroundings, and hence it can be difficult to contact users of mobile phones who have, for example, turned down the volume on the mobile phone so much that user being called does not notice that his/her mobile phone is ringing. This may result in user dissatisfaction and inconvenience since the user of the mobile phone may miss important calls.

One example in which user inconvenience due to a missed call may arise when the user of the mobile terminal being called is attending a sporting event such as a National Football League (NFL)™ game. While at the game another user may attempt to call the user at the football game and notify him/her of an emergency, for example. If the volume setting of the user of the mobile phone who is at the football game is too low he/she may miss this important phone call. On the other hand, there may be situations in which a user of a mobile phone purposely wishes to miss calls or messages. For instance, the user of the mobile phone (i.e., called party) may purposely reject a phone call or message alert from another user (i.e., calling party) and the user of the mobile phone being called may not be interested in returning or responding to the other user's call (at least not at the present time). Currently, if the calling party calls the user again, the mobile phone will typically ring in the same manner (e.g., at the same volume level) as it did before i.e., when the user of the mobile phone (i.e., called party) ignored the call, notwithstanding the fact that the user (i.e., called party) is not interested in communication with the calling party during this time. Receiving phone calls from a person that the called party does not wish to communicate with at the same ringing volume as other calls (e.g., calls of importance) may be a nuisance and inconvenience to the called party.

In order to provide a solution for the problems described above, it may be advantageous to provide a method for improving alerting and notification capabilities, such as for example, call alerts and message alerts of a mobile device.

BRIEF SUMMARY OF THE INVENTION

The exemplary embodiments of the present invention provide a method, apparatus, computer program product and device for intelligently adjusting a volume level for incoming call alerts and message alerts. In the exemplary embodiments of the present invention if the user of a terminal has already missed a call (i.e., unread/unnoticed) from a specific person (e.g., user of an electronic device), the ringing volume can be increased if the person calls the user of the terminal again. In this regard, the volume level may be increased further if the user has two or more missed calls from the same person. This may be beneficial since it enables the user of the terminal to hear important or urgent call/message alerts better, for example, in noisy surroundings.

Additionally, in the exemplary embodiments of the present invention, if the user has recently rejected a call from a person, a volume level associated with a corresponding alert may be decreased if the user of the electronic device calls the user of the terminal again. This allows calls and/or messages (also referred to herein as communications) to be less of a nuisance and inconvenience to the recipient of the calls/messages since manual rejection of a call/message is oftentimes a deliberate action which indicates that the calls/messages from the person are not desired, at least not at the present time.

In one exemplary embodiment, a method and a computer program product and a means for intelligently adjusting the volume for incoming call alerts and message alerts are provided. The method and computer program product includes receiving a first communication from a user and timing a predetermined time period upon receipt of the first communication. The method and computer program product further includes determining whether the first communication is missed or rejected, receiving a second communication from the user within the predetermined time period and automatically adjusting a volume corresponding to a first alert associated with the second communication when the determining reveals that the first communication was missed or rejected.

In another exemplary embodiment, an apparatus for intelligently adjusting the volume for incoming call alerts and message alerts is provided. The apparatus includes a processing element configured to receive a first communication from a user, time a predetermined time period upon receipt of the first communication and determine whether the first communication is missed or rejected. The processing element is further configured to receive a second communication from the user within the predetermined time period and automatically adjust a volume corresponding a first alert associated with the second communication when the determination reveals that the first communication was missed or rejected.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
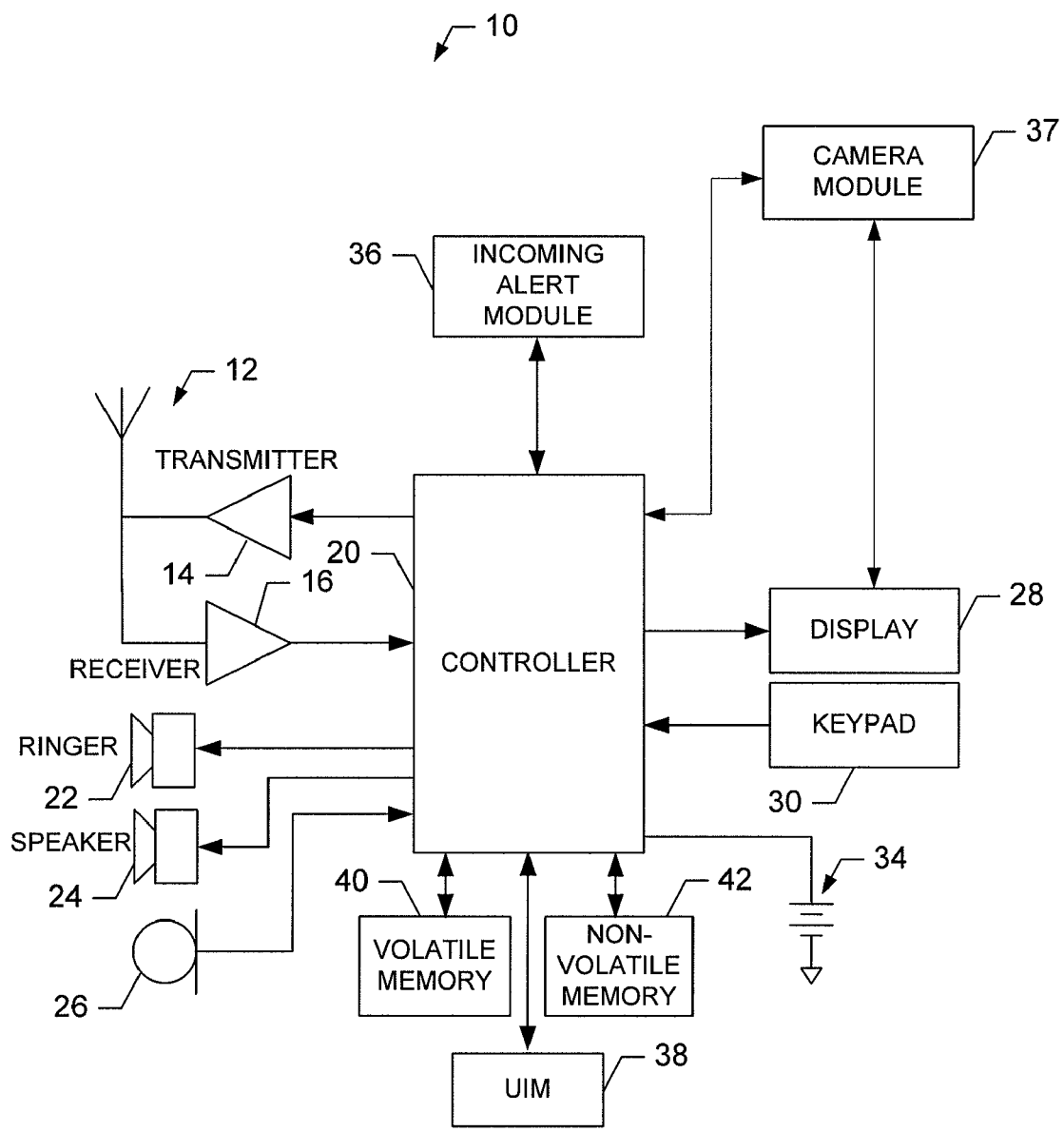
FIG. 1 is a schematic block diagram of a mobile terminal according to an exemplary embodiment of the present invention.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. In an exemplary embodiment, the ringer 22 may have multiple ringing tone volume levels. For example, the ringer 22 may include, but is not limited to five volume levels designated as "0," "1," "2," "3," "4" and "5." Each volume level that is numbered higher than a preceding lower numbered volume level may have a corresponding higher volume level than the volume level below it. For instance, a volume level designated as "1" may have a higher volume than a volume level designated as "0," whereas a volume level designated as "2" may have a volume that is greater than a volume level designated as "1" but which may have a volume that is lower than a volume level designated as "3" so on and so forth. The user input interface, which allows the mobile terminal 10 to receive data, may include any of a number of devices allowing the mobile terminal 10 to receive data, such as a keypad 30, a touch display (not shown) or other input device, such as buttons for navigating through menus, sub-menus and the like. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The user input interface may be utilized by a user of the mobile terminal 10 to set or adjust the volume levels of the ringer 22. In an exemplary embodiment, the mobile terminal's 10 default volume level may be set at volume level "3." Additionally or alternatively, a user of the mobile terminal 10 may select or adjust the volume level by depressing a button(s) to navigate one or more menus and select an appropriate volume level (e.g., among volume levels "1," "2," "3," "4," and "5") The mobile terminal 10 further includes a battery 34, such as a vibrating battery pack, for powering various circuits that are required to operate the mobile terminal 10, as well as optionally providing mechanical vibration as a detectable output. For instance, when the volume level is set or adjusted to "0," the battery pack is capable of vibrating the mobile terminal 10. In this regard, volume level "0" may correspond to a silent mode.

In an exemplary embodiment, the mobile terminal 10 includes an incoming alert module 36 in communication with the controller 20. The incoming alert module may be any device or means in hardware and/or software capable of receiving incoming call alerts and/or messages from the receiver 16. The call alerts include but are not limited to phone calls and these messages include, but are not limited to, SMS messages, (e.g., text messages, news alert messages, financial information messages, logos, ring tones and the like) e-mail messages, multimedia messaging service messages (MMS) (e.g., graphics, animations, pictures, video clips, etc.) and the like sent by the user of the mobile terminal 10 (e.g., the user e-mails his/her own e-mail address) or a user of another electronic device (e.g., personal digital assistant (PDA), pager, laptop computer, personal computer, mobile telephone and the like). Further, the incoming alert module is capable of transferring the call alert and/or message to the controller 20 which assesses the ringer 22 and causes the ringer 22 to alert or notify the user of the incoming call(s) or message(s) via an audible ring tone having a volume level corresponding to the default volume level or a volume level set or adjusted by the user of the mobile terminal 10. It should be pointed out that if the volume level is set to "0" when a corresponding call alert(s) and/or message(s) is provided by the incoming call alert module 36 to the controller 20, the controller 20 is capable of causing the battery 34 to vibrate as a notification to the user of the mobile terminal 10 that a call alert and/or message was received.

In an exemplary embodiment, the mobile terminal 10 includes a camera module 37 in communication with the controller 20. The camera module 37 may be any means for capturing an image for storage, display or transmission. For example, the camera module 36 may include a digital camera capable of forming a digital image file from a captured image. As such, the camera module 37 includes all hardware, such as a lens or other optical device, and software necessary for creating a digital image file from a captured image. Alternatively, the camera module 37 may include only the hardware needed to view an image, while a memory device of the mobile terminal 10 stores instructions for execution by the controller 20 in the form of software necessary to create a digital image file from a captured image. In an exemplary embodiment, the camera module 37 may further include a processing element such as a co-processor which assists the controller 20 in processing image data and an encoder and/or decoder for compressing and/or decompressing image data. The encoder and/or decoder may encode and/or decode according to a JPEG standard format. The camera module 36 is also capable of sending/receiving an image in one or more MMS messages.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. It should be pointed out that each of the elements of the mobile terminal 10 may be represented as logical functions and embodied in an application specific integrated circuit (ASIC).

Figure 2:
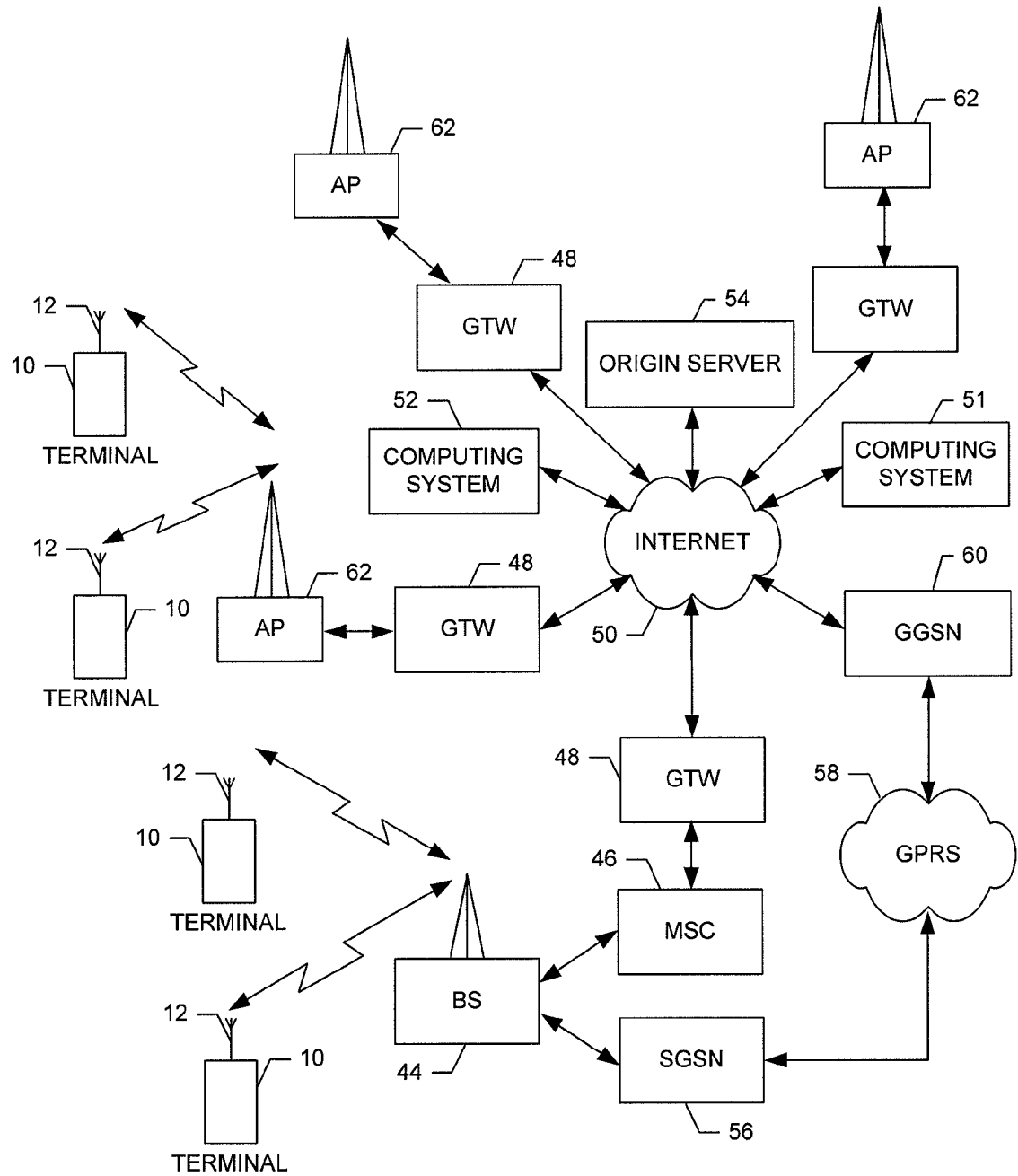
FIG. 2 is a schematic block diagram of a wireless communication system according to an exemplary embodiment of the present invention.

Referring now to FIG. 2, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls (e.g. phone calls, also referred to herein as call alerts) to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages (including but not limited to SMS messages, MMS messages, e-mail messages, text messages and the like) for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as SMS messages, MMS messages, e-mail messages, text messages and the like. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, in which certain elements of an incoming alert module 36 for intelligently adjusting the volume level for incoming call alerts and/or message alerts are displayed. The incoming alert module 36 of FIG. 3 may be employed, for example, on the mobile terminal 10 of FIG. 1 or the network devices of FIG. 2. However, it should be noted that the incoming alert module 36 of FIG. 3 may also be employed on a variety of other devices, both mobile and fixed, and therefore, the present invention should not be limited to application on devices such as the mobile terminal 10 of FIG. 1 or the network devices of FIG. 2 although an exemplary embodiment of the invention will be described in greater detail below in the context of application in a mobile terminal. Such description below is given by way of example and not of limitation. For example, the incoming alert module 36 of FIG. 3 may be employed on other electronic devices, including but not limited to, a personal computer, laptop computer, mobile phone, personal digital assistant, (PDA) etc. It should also be noted that while FIG. 3 illustrates one example of a configuration of the incoming alert module 36, numerous other configurations may also be used to implement the present invention.

Figure 3:
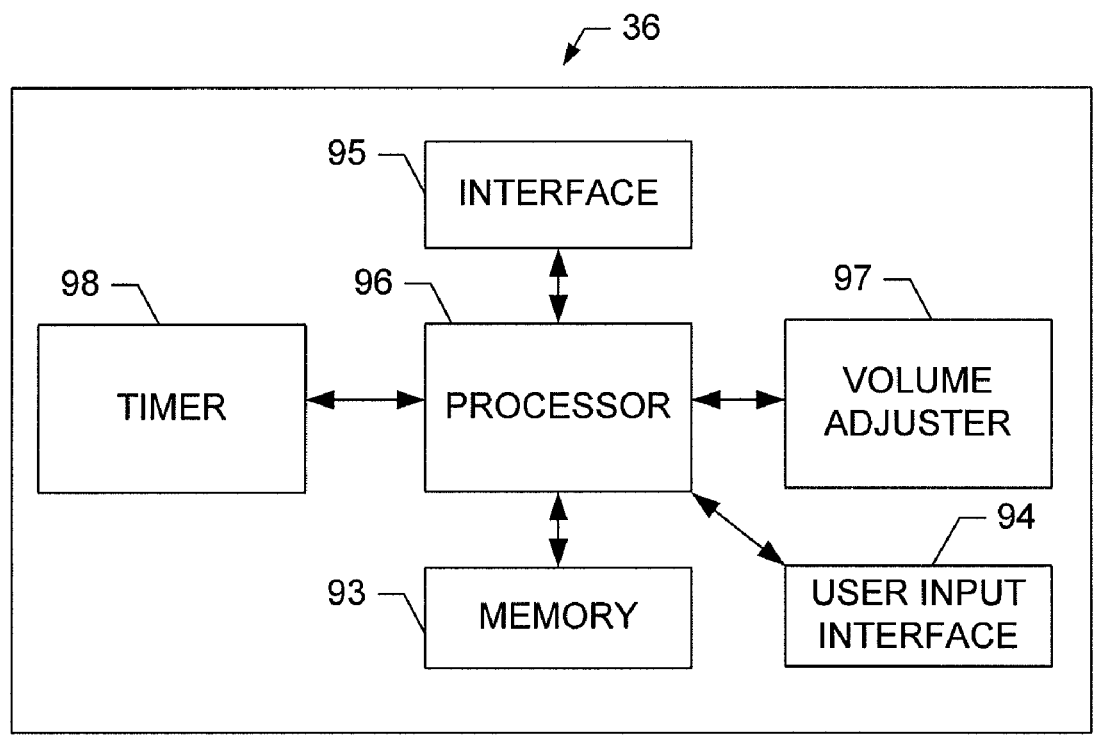
FIG. 3 is a schematic block diagram of an incoming alert module according to an exemplary embodiment of the present invention.
Figure 4:
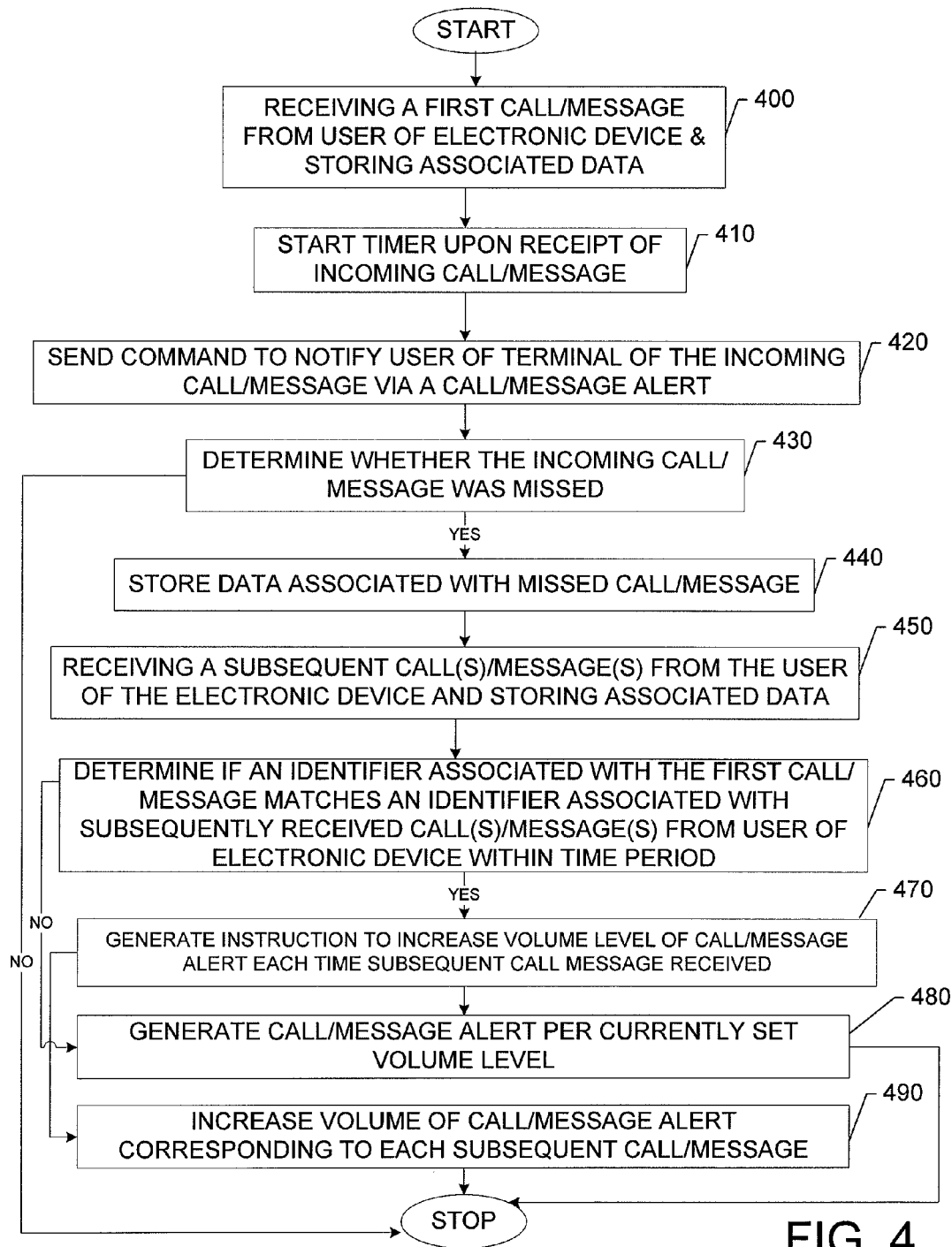
FIG. 4 is a flowchart of a method for intelligently increasing a volume level for incoming call alerts and message alerts according to an exemplary embodiment of the present invention.

Referring now to FIGS. 3 and 4, an incoming alert module and a flowchart for intelligently increasing the volume level for incoming call alerts and/or message alerts are provided. The incoming call alert module 36 includes a memory 93, a user input interface 94, an interface 95, a processor 96, a volume adjuster 97 and a timer 98. The processor 96 is connected to the memory 93, the user input interface, the interface 95, the volume adjuster 97 and the timer 98. The processor 96 is capable of executing one or more software programs which may be stored in memory 93 and is capable of receiving data or content from the interface, issuing instructions or commands to the volume adjuster 97 and the timer 98. The processor 96 is further capable of sending data or content to the memory 93 for storage and is capable of issuing instructions or commands and causing the interface 95 to send these instructions or commands to the ringer 22 and/or the vibrating battery 34, via controller 20. These instructions or commands may include data provided by the timer 98 and the volume adjuster 97 as well as the memory 93. Additionally, the processor 96 is capable of linking call alerts (e.g., phone call) and messages (e.g., text message) (that are stored in memory 93) sent from a common user (for e.g., Jim Blass). In an exemplary embodiment, the processor 96 may link the call alerts with the messages based on a phone number of a common user. In an alternative exemplary embodiment, the processor 96 may link a call alert(s) and a message(s) based on at least one of a common name of the sender of the call alert and the message, (e.g., the processor 96 determines that a person named Jim Blass is the sender of the call alert as well as the sender of the message) a common mailing address and/or e-mail address of the sender of the call alert and the message.

The memory 93 is connected to the processor 96 and the memory 93 may comprise volatile and/or non-volatile memory and typically stores content, data and the like. For example, the memory 93 may store a contact's list and/or an address book consisting of phone numbers, e-mail addresses, mailing addresses and the like associated with one or more persons. The memory 93 may also store data associated with missed as well as rejected call alerts, (e.g., phone calls) and/or missed or unread messages as well as rejected messages (e.g., SMS messages, text messages, MMS messages, e-mail messages and the like) sent by a user of an electronic device to the mobile terminal 10. In this regard, a rejected call/message may be a call/message that the user of the mobile terminal 10 rejects by pressing an Ignore button, an End key, an Exit key or the like upon receipt of a call/message alert (See discussion below). The user input interface 94 can comprise any of a number of devices allowing the user of the mobile terminal 10 to input data, select various forms of data and navigate menus or sub-menu's or the like. In this regard, the user input interface includes but is not limited to a joystick(s), a button(s), a soft key(s) or other input device(s).

The processor 96 is connected to at least one communication interface 95 for transmitting and/or receiving data, content or the like. More particularly, the interface 95 is capable of receiving incoming call alerts and/or incoming messages from receiver 16 of the mobile terminal 10 and is further capable of transmitting data (such as, for example, volume settings and commands) to the ringer 22 and vibrating battery 34 via controller 20.

The volume adjuster 97 is connected to the processor 96 and may be any device or means embodied in hardware and/or software or a combination of hardware and software that is capable of generating a command to increase and/or decrease a ring tone volume level or setting. In an exemplary embodiment, the volume adjuster 37 can be software executed in and embodied by the processor for generating commands to be sent to ringer 22. The command may be sent, via controller 20, to ringer 22 which increases or decreases a ring tone volume level, (e.g., "0," "1," "2," "3," "4" and "5") associated with a received call alert or message, based on instructions within the command. The timer 98 may be any device or means embodied in hardware, software or a combination of hardware and software that is capable of timing a period in which a call alert or message is received and remains stored in memory 93. Further, a time period for defining a recently received call alert or message may be set by a network operator such as, for example, a communications provider. Additionally and/or alternatively a user of the mobile terminal may set the time period, via keypad 30, (or via user input interface 94) to define a recently received call alert or message in the timer 98.

As noted above, the incoming call alert module 36 is capable of intelligently adjusting the volume level for call alerts and for message alerts. When a call alert (e.g., phone call) or a message alert (SMS message, text message, MMS message, e-mail message, etc.) is received by receiver 16 from another electronic device, for example, another mobile terminal (or computing system 52, for example) it is retrieved by the incoming alert module 36 via controller 20 and data (for example, phone number of the calling/sending party) associated with the call alert or the message alert is stored in memory 93. (Step 400) Additionally, upon receipt of the call/message alert, the processor 96 causes the timer 98 to be invoked. (Step 410) It should be pointed out that the timer times out or expires after a predetermined time period. For example, the timer 98 may time out or expire 24 hours from receipt of the call/message from the user of the electronic device. (It should be pointed out that the timer 98 may be set to time out or expire according to any suitable time period including but not limited to 1 hour, 2 hours, 5 hours, etc.) The time period in which the timer 98 expires or times out may be set by a network operator (e.g., a cellular communications provider) or may be set or adjusted by the user of the mobile terminal 10 via keypad 30 (or via user input interface 94). After the processor stores data associated with the call/message alert in memory 93 and invokes the timer, the processor (or controller 20) sends a command or instruction to ringer 22 to notify the user of the call/message alert with a ring tone. (Step 420) The ring tone has a volume corresponding to a predefined or adjusted volume level. For example, the ring tone may ring with a volume level of "3." (It should be pointed out that the ring tone may be set or adjusted to any other suitable volume level, either by the network operator (e.g., communications provider) or by the user).

The processor 96 (e.g., the controller 20) monitors or determines whether the user of the mobile terminal answers the call alert or reads the message alert. (Step 430) For instance, answering the call alert may be achieved when the user selects a button on the keypad 30 (or via user input interface 94) to accept the call or according to any other suitable manner such as for example, picking up the mobile terminal and speaking into the microphone 26. And reading the message may be achieved by the user of the mobile terminal 10 pressing a joystick or key of the user input interface 94 causing the contents of the message to be displayed on display 28. If the processor (or the controller 20) determines that the user of the mobile terminal 10 did not answer the call or read the message, the processor is capable of storing data in memory 93 indicating the time and the date of the call/message and indicates that the call was not answered (i.e., indicates that the call was missed (e.g., unnoticed)) or that the message was not read. (Step 440) (Conversely, if the processor 96 determines that the user of the mobile terminal 10 answers the call or reads the message, the method ends. See FIG. 4 (Stop))

If the user of the electronic device i.e., calling/sending party (i.e., the user of the other mobile terminal or the computing system 52 in the above e.g.) calls or sends a message to the user of mobile terminal 10 again, the incoming alert module 36 receives this corresponding call/message, via interface 95 and the processor stores data associated with the call/message (e.g. phone number of the calling/sending party) in the memory 93 (Step 450) and if the processor determines that an identifier, such as for example, a phone number (or alternatively, a mailing address and/or email address of the calling/sending party or a name of the calling/sending party) matches the identifier e.g., phone number (or alternatively, a mailing address and/or email address of the calling/sending party or a name of the calling/sending party) of the previously missed call or unread message, (Step 460) the processor 96 invokes the volume adjuster 97 to generate a command or instruction to increase the volume setting at the ringer 22, provided that the second call/message is received within the predetermined time period, i.e., within 24 hours in this example, (Step 470) so that the ring tone volume may be increased. In this example, the instruction or command generated by the volume adjuster 97 may contain data to increment or increase the volume level by a factor of one. (However, it should be pointed out that the instruction or command generated by the volume adjuster 97 may contain data associated with incrementing the volume setting at the ringer 22 by any suitable factor such as for example a factor or two.) If the identifier of the currently received call/message does not match an identifier of a previously received call/message, the ringer generates a call/message alert according to a current volume setting of the ringer 22. (Step 480)

The command or instruction generated by the volume adjuster 96 is retrieved by the processor 96 (from the volume adjuster 97) and is sent to the ringer 22, which increases the volume setting of the ring tone by one, i.e., from volume level "3," to volume level "4." (Step 490) In this regard, the volume level of the call/message alert is increased automatically without the user manually changing the volume level of the ringer 22 and an urgent or important call/message can be better heard by the user due to the increased volume, particularly in noisy surroundings, for example.

The processor 96 (or alternatively the controller 22) may monitor whether the user of the mobile terminal 10 answers the second call alert or reads the second message alert which rings according to an increased ring tone volume. If the processor (or alternatively the controller) determines that the user of the mobile terminal did not answer the second call/message alert generated by the electronic device and sent to the mobile terminal 10, the processor stores data indicating that the second call/message alert was not answered, i.e., that the call was missed or the message was unread, and stores the corresponding date and time of the missed call/message alert as well. If the user of the electronic device calls or sends a message to the user of the mobile terminal 10 again (i.e., a third time) the corresponding call/message alert is retrieved by the incoming alert module 36 from receiver 16, via interface 95 and controller 20 and data associated with the call/message is stored in the memory 93 (for example, data associated with an identifier associated with the call/message alert as well as the time and date of the call/message).

If the identifier (e.g., phone number or alternatively mailing address, e-mail address of the calling/sending party or name of the calling/sending party) matches the identifier (e.g., phone number or alternatively mailing address, e-mail address of the calling/sending party or name of the calling/sending party) of the two previous missed call/message alerts within the predetermined time period, for example 24 hours, the processor causes the volume adjuster 97 to generate a command or instruction to increase a volume setting at the ringer 22. This instruction or command is retrieved by the processor 96 from the volume adjuster 97 and is sent to the ringer 22 via interface 95 and controller 20. As in the above situation, the instruction or command generated by the volume adjuster 97 instructs the ringer to increase or increment a volume level of the ringer 22 by a factor of one, for example (however, any suitable factor increasing the volume level may be chosen as noted above, for example, a factor of two, etc.).

The ringer 22 receives the instruction generated by the volume adjuster and increases a volume level of a ring tone by a factor of one. As such, the ring tone has a volume level of "4" (i.e., one level higher than the volume level of the second call/message alert that was missed/unread which was volume level "3"). In this regard, the ringer 22 rings with a volume that is increased from a volume level associated with the two previous missed call/message alerts. As such, the user of the mobile terminal 10 has an even better chance of hearing the call/message alert in noisy surroundings and increases the chances that an important or urgent call/message will be brought to his/her attention. It should be pointed out that the above process is capable of being repeated each time the same calling/sending party calls or sends a message to the user of the mobile terminal 10, within the predetermined time period, e.g., 24 hours, and a previous call/message from the same calling/sending party is missed or is unread.

For example, if the processor 96 determines that the user of the mobile terminal 10 did not answer/read the third call/message sent by the user of the electronic device and thereafter calls or sends a message to the user of the mobile terminal 10 a fourth time within the predetermined time period, i.e., 24 hours, the volume adjuster 97 generates an instruction to increase the volume level at the ringer 22 (i.e., in the same manner as that explained above) causing the volume of the ring tone to be increased to a volume of "5," which in this example is the maximum volume level setting of the ringer 22. It should be pointed out that if subsequent calls/messages (i.e., calls/messages generated after an initial call/message of the user of the electronic device) generated by the user of the electronic device are not received by the mobile terminal 10 within the predetermined time period e.g., 24 hours, the volume levels at the ringer are not automatically increased.

Figure 5:
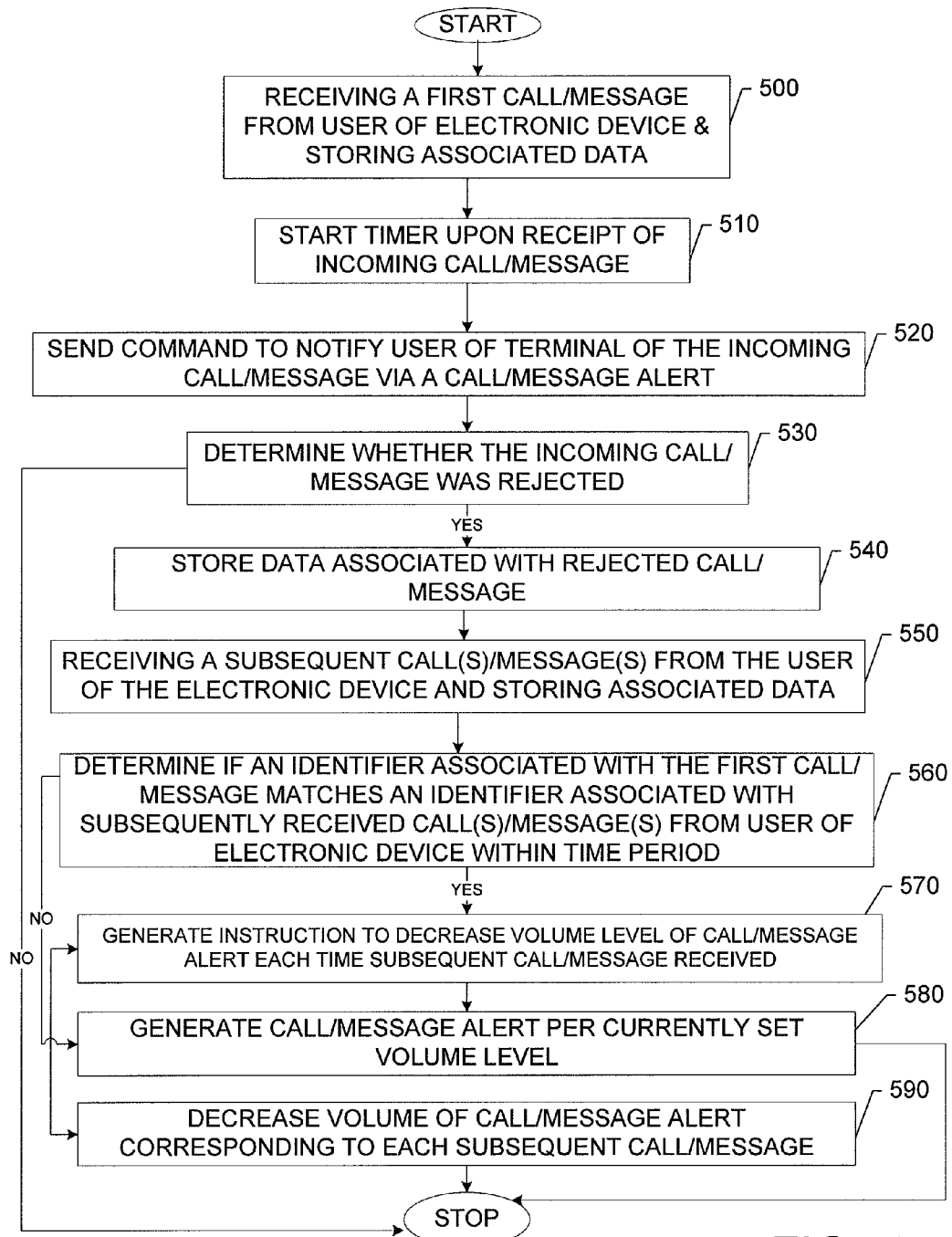
FIG. 5 is a flowchart of a method for intelligently decreasing a volume level for incoming call alerts and message alerts according to an exemplary embodiment of the present invention.

Referring now to FIGS. 3 & 5 the incoming alert module and a flowchart for intelligently decreasing a volume level for incoming call alerts and message alerts are provided. In this regard, when the user of the mobile terminal 10, rejects a call/message sent by a user of the electronic device, as opposed to the call/message being missed by being unnoticed or simply unread, the volume level of the ringer 22 may be decreased or decremented by a predetermined factor each time another call/message is sent by the same user of the electronic device. In this regard, a rejected call/message may be any call/message received from a sender of a device that is rejected upon selection of an Ignore key, an Exit key, or End key or the like of the user input interface 94 (or keypad 30) (See also discussion below). As in the above example, the user of the electronic device may call or send a message to the user of the mobile terminal 10 and the corresponding call/message is retrieved by the processor 96 via controller 20 and interface 95 from receiver 16. (Step 500)

Upon receipt of the call/message the timer 98 is invoked and begins to time a time period. (Step 510) The processor stores data associated with the call/message in memory 93 such as for example, the time and date of the call/message as well as at least one identifier (e.g., phone number, or alternatively an e-mail address and/or mailing address of the calling/sending party or a name of the calling/sending party) corresponding to the call/message. Thereafter, the call/message is provided to the ringer 22 by processor 96 via interface 95 and controller 20. (Step 520) The call/message and the corresponding call/message alert received at the ringer 22 rings with a ring tone having a volume corresponding to the volume level setting of the ringer 22 in this example volume level "3" (in this example an initial default volume level). The processor or the controller monitors or determines whether the call/message alert was rejected by the user of the mobile terminal 10. (Step 530) In this regard, the user of mobile terminal 10 may reject the call/message alert according to any suitable manner such as, for example, pressing an "Ignore" button on keypad 30 (or via user input interface 94) and an "End" key or "Exit" soft key on keypad 30 (or via user input interface 94).

If the user of the mobile terminal 10 rejects the call/message alert, the processor stores corresponding data in the memory 93 indicating that the call/message alert was rejected and stores the time and date that the call/message alert was rejected. (Step 540) If the user of the electronic device calls or sends a message to the user of the mobile terminal 10 again, (i.e., a second time, e.g., second call/message alert) the incoming alert module retrieves the call/message alert from receiver 16 and stores data associated with the call/message alert in the memory 93 such as an identifier as well as the time and date of this second call/message alert. (Step 550) The processor determines whether the identifier (e.g., phone number) corresponding to this second call/message alert matches a previously stored identifier for example an identifier associated with first call/message alert that was rejected. (Step 560) If the processor determines that the identifiers match, and that the second call/message alert is received within the predetermined time period, the processor causes the volume adjuster to generate an instruction or command to decrease or decrement a volume setting at the ringer 22. (Step 570) Otherwise, the ringer 22 alerts the user of the call/message according to the current volume level (if this situation applies, the method is ended). (See Step 580 and "Stop" in FIG. 5) The instruction or command generated by the volume adjuster may contain data instructing the ringer 22 to decrement or decrease a volume level by a factor of one, or any other suitable factor, e.g. two, etc. For purposes of illustration only, in this example the instruction generated by the volume adjuster 37 indicates to decrease or decrement a volume level by a factor of one at the ringer 22. The instruction or command is retrieved by the processor and is sent to the ringer 22 via interface 95 and controller 20.

When the ringer receives the instruction generated by the volume adjuster, the ringer 22 decreases or decrements a volume level of a ringer tone for the call/message alert. (Step 590) In this example, the ringer 22 decreases or decrements the volume level of the ring tone from a volume level of "3" to a volume level of "2." In this manner, the volume level is automatically lowered or decreased without the user of the mobile terminal manually changing any volume level or setting of the ringer 22 and call/message alerts generated from a user who the user of the mobile terminal is not currently interested in speaking to may be less of a nuisance and less of an inconvenience to the user of the mobile terminal 10.

If the user of the electronic device calls or sends a message to the user of the mobile terminal a third time, the call/message (i.e., third call/message) is retrieved by the processor 96 from receiver 16 via controller 20 and interface 95 and the processor causes the memory to store data associated with this third call/message in the memory 93 such as an identifier and the date and time of the third call/message. The processor also determines if the identifier of the third call/message matches an identifier of the first and second calls/messages. If there is a match between the first, second and third calls/messages, the processor instructs the volume adjuster 97 to generate an instruction or a command to decrement or decrease a volume level at the ringer 22. In this example, the instruction or command generated by the volume adjuster instructs the ringer 22 to decrement or decrease the volume level by a factor of one. However, as noted above the instruction may specify to decrement or decrease the volume setting by any suitable factor such as two, etc.

The processor 96 sends the instruction generated by the volume adjuster to the ringer 22 via interface 95 and controller 20 and when the ringer 22 receives the instruction or command, the ringer decreases the volume level to a volume level of "1," from a volume of "2". In this regard, the ring tone associated with the third call/message alert is decreased even lower than that from the second and first call/message alerts resulting from the first and second calls/messages sent by the user of electronic device. As such, multiple call/message alerts arising from calls/messages sent from a calling/sending party that are rejected may become less of a nuisance to the user of the mobile terminal 10.

The processor 96 may determine whether the user of the mobile terminal rejects the third call/message alert and if so, the processor 96 sends an instruction (in the same manner as that provided above) generated by volume adjuster 97 to decrease the volume setting at the ringer 22, in this example by a factor of one. When the ringer 22 receives the instruction generated by the volume adjuster 97, the ringer 22 decreases the volume level of a corresponding ring tone by a factor of one. In this example, the volume is decreased from a volume level of "1" to a volume level of "0." The volume level setting of "0" may be predefined by the network operator (e.g., cellular communications operator) as silent mode which invokes the vibrating battery 34 to vibrate the mobile terminal 10 as notification to the user of the mobile terminal 10 of the call/message alert. Alternatively, the user can change this setting (i.e., change the volume level "0" from a silent mode to a ring tone) via keypad 30 (or via user input interface 94) to have a volume lower than volume level "1." In this manner, a ring tone having a volume lower than volume level "1" would notify the user of the call alert, albeit with a volume lower than a volume of any other volume level. It should be pointed out that if subsequent calls/messages sent (i.e., calls/messages sent after an initial call/message sent by the user of the electronic device) from the user of the electronic device are not received within the predetermined time period, e.g., 24 hours, the volume levels at the ringer 22 are not automatically decreased.

Figure 6:
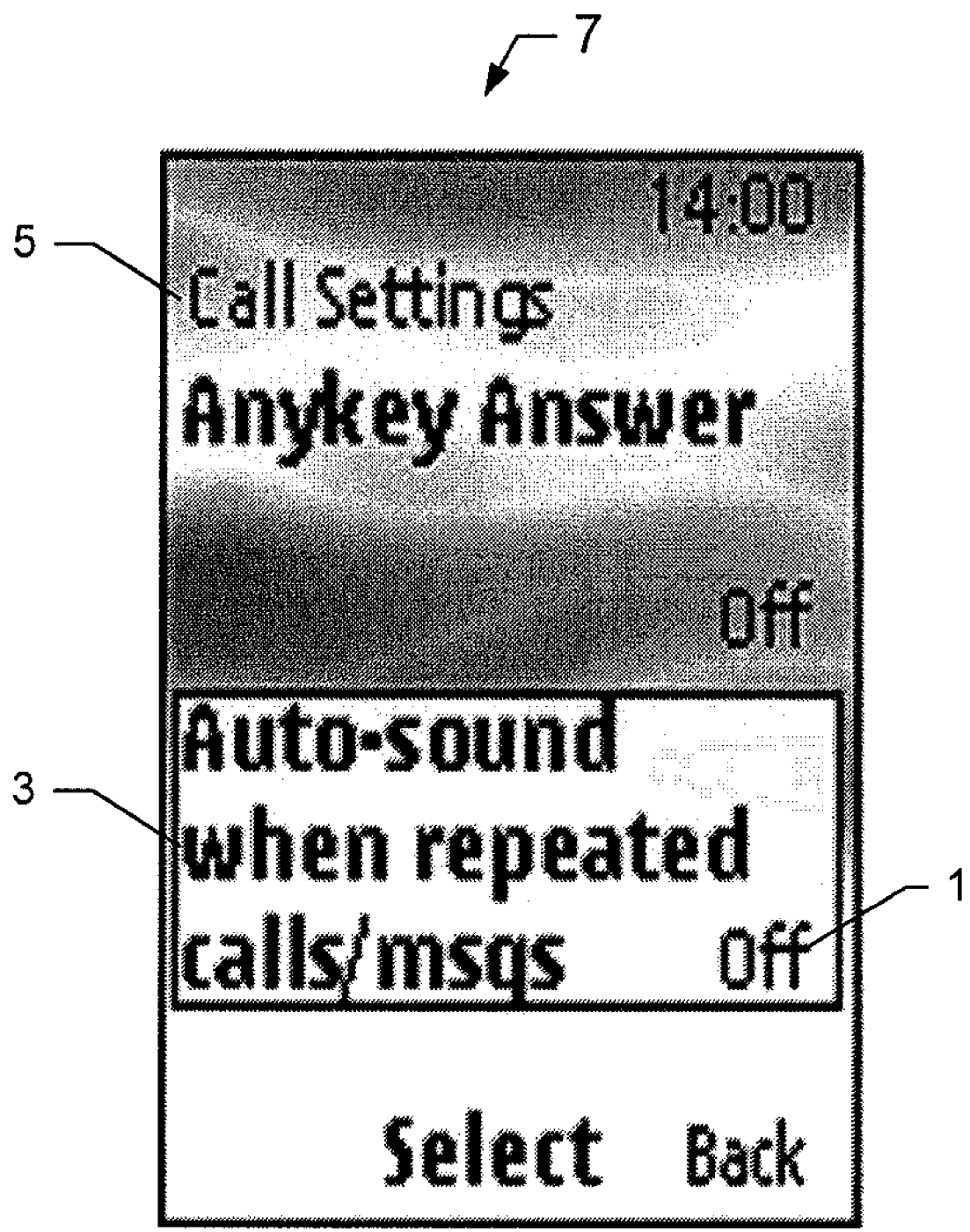
FIG. 6 is a diagram of a user setting according to an exemplary embodiment of the present invention.

Referring now to FIG. 6, an exemplary embodiment of a user setting is provided. The user setting may be any means embodied in software and/or hardware for enabling the user of the mobile terminal to make or select changes to call/message settings 5 of the mobile terminal 10. The user setting 7 may be accessible via a soft key or button of user input interface 94 (or alternatively a soft key of keypad 30, for example) and is capable of being activated or invoked upon depression of this soft key or button. In situations in which the volume level at the ringer 22 is set to "0" (or is adjusted of a setting of "0") and is in a silent mode in which the vibrating battery 34, vibrates the mobile terminal 10 to notify the user of a call/message alert, the user setting 7 may be assessed or invoked by pressing a soft key which allows user setting 7 to be displayed on display 28. The user of the mobile terminal 10 may then use a joystick or the like of user input interface 94 to navigate the user setting 7 and select the Auto-sound when repeated call/msgs feature 3 of the user setting 7.

Selection of the Auto-sound when repeated call/msgs feature 3 switches the mobile terminal 10 from silent mode to a ring tone mode in which the ringer 22 generates a ring tone having a predetermined volume level upon receipt of the next call/message alert by the mobile terminal 10. In this example, selection of the Auto-sound when repeated call/msgs feature 3 increments the volume level setting of the ringer 22 by a factor of one. (However, it should be pointed out that the Auto-sound when repeated call/msgs feature 3 may be set to increase the volume level setting of the ringer 22 by any suitable factor such as for example two, three, etc. The factor in which to increment the volume setting upon selection of the Auto-sound when repeated call/msgs feature 3 is generally established or determined by a network operator (e.g., cellular communications provider)). As such, when a user of an electronic device calls or sends a message to the user of the mobile terminal 10, the incoming alert module 36 retrieves the call/message, via processor 96, from the receiver 16 and stores data associated with the call/message such as the time and date of the call/message. The processor 96 causes the volume adjuster 97 to generate an instruction or command to change a volume setting at the ringer 22 from silent mode to a ring tone mode. The processor retrieves this instruction or command generated by the volume adjuster 37 and sends the instruction as well as the call/message to the ringer 22 via interface 95 and controller 20. In this regard, the ringer 22 receives the instruction generated by the volume adjuster 37 and switches the volume level setting from "0" (i.e., silent mode) to a volume level setting of "1" and the ringer generates call/message alert such as for example, a ring tone having a volume corresponding to the volume level setting of "1."

In an alternative exemplary embodiment, when the mobile terminal 10 receives another call/message (i.e., a second call/message) from the user of the electronic device or any other user of another electronic device, data associated with the call/message, is retrieved by the processor of the incoming alert module 36 and is stored in the memory 93. Thereafter, the processor 96 causes the volume adjuster 97 to generate an instruction or command to increase or increment a volume level of the ringer 22. This instruction or command is sent by the processor 96 to the ringer 22, via interface 95 and controller 20, which receives the instruction and increases the corresponding volume level from "1" to a volume level of "2." As such, the volume of the call/message alert, e.g., a ring tone, notifying the user of the mobile terminal 10 of the call/message (i.e., the second call/message) is increased. It should be pointed out that in this alternative exemplary embodiment, (in which the mobile terminal initially has a volume level of "0" signifying a silent mode) that each time a call/message alert is received by the mobile terminal 10, once the user of the mobile terminal 10 has selected the Auto-sound when repeated calls/msgs feature 3, the ringer 22 may increment or increase a previous volume level (in the same manner as that discussed above). For example, if the mobile terminal 10 receives a third call/message, the ringer 22 is capable of changing the volume level from "2" to a volume level of "3" and so on and so forth.

Additionally or alternatively, in this alternative exemplary embodiment, selection of the Auto-sound when repeated calls/msgs feature 3 via a soft key, for example, of user input interface 94, is capable of changing a call/message setting stored in the memory 93 of the incoming alert module 36 and enables the processor 96 to link one or more calls to one or more message such that if a user of the mobile terminal 10 has previously received a missed call/message (e.g., the user of the mobile terminal 10 did not notice the call or the message is unread) sent from another user of an electronic device and then the user of the mobile terminal 10 receives a message (or alternatively a call) sent from the same user of the electronic device, a volume level associated with a ring tone corresponding to the received message alert (or alternatively the received call alert) is increased higher than a volume level associated with a ring tone corresponding to the previously received call alert (or alternatively the received message alert).

In this regard, volume associated with the ring tone alerting the user of the mobile terminal 10 of the message alert (or alternatively the call alert) rings with a volume that is higher than the ring tone alerting the user of the mobile terminal 10 of the call alert (or alternatively the message alert). As noted above, the processor 96 can link messages and calls sent from the same user of an electronic device and cause the volume level of the ringer 22 and a corresponding alert to be increased based on the most recently received call/message by the user of the electronic device, irrespective of whether the call is received first or if the message is received first by the mobile terminal 10. It should be pointed out that the user of the mobile terminal 10, may turn off the Auto-sound when repeated calls/msgs feature 3 by selecting the Off 1 option of the user setting 7.

To illustrate the above, consider the following exemplary scenario(s). The user of the mobile terminal 10 may use a joystick, soft key or the like of the user input interface 94 to select the Auto-sound when repeated calls/msgs feature 3 of user setting 7 which causes the processor 96 to link call alerts and message alerts generated from the same user of an electronic device. It should be pointed out that in this exemplary embodiment the volume level of ringer 22 is initially set to "3." (However, the ringer volume level of the ringer 22 may be initially set to any suitable ringer volume level.) When the user of an electronic device calls (or alternatively sends a message (e.g., SMS/text message, MMS message, e-mail message, etc.) alert to) the user of the mobile terminal 10, the processor of the incoming alert module 36 receives the corresponding call alert (e.g., phone call) (referred to herein as the first received alert) from the receiver 16 and stores data associated with the call alert (or alternatively the message alert) in the memory 93. This data may include the time and date of the call alert as well as an identifier (e.g., phone number of the calling party, i.e., the user of the electronic device) of the call alert (or alternatively the message alert).

Upon receipt of the call alert (or alternatively the message alert), the processor 96 also invokes the timer 98 to begin timing a time period. The processor may simultaneously store the data associated with the call alert (or alternatively the message alert) in memory 93 and invoke the timer 98. The processor 96 then sends the call alert (or alternatively the message alert) to the ringer 22, via interface 95 and controller 20, which causes the ringer 22 to notify the user of the call alert (or the message alert) with a ring tone having a volume level of "3." The processor 96 also monitors whether the user of the mobile terminal 10 answers the call alert (or reads the message alert). If the processor determines that the user of the mobile terminal 10 does not answer (i.e., a missed or unnoticed call) the call alert, (or does not read the message alert) the processor causes data to be stored in memory 93 which indicates that the call alert was missed (or that the message alert was unread).

When the user of the electronic device subsequently sends the user of the mobile terminal 10 a message alert, (or alternatively a call alert) (referred to herein as the second received alert) the processor 96 retrieves the message alert (or call alert) and stores data associated with the message alert (or call alert) in the memory 93 such as the time and date of the message alert (or call alert) as well as an identifier (e.g., phone number of the user of the electronic device) of the message alert (or call alert). The processor 96 then evaluates the memory 93 and determines whether the call alert (i.e., the first received alert) and the message alert (i.e., the second received alert) are linked or associated with each other. The processor determines that a call alert and a message alert are linked to each other when there is a common identifier associated with the call alert and the message alert. In this exemplary embodiment, when the phone number associated with the call alert and the message alert are the same, the processor links the call alert and the message alert and stores data associated with this linkage in memory 93. However, in an alternative exemplary embodiment, the processor may link a call alert(s) and a message alert(s) having or sharing a common name, or a common mailing address and/or e-mail address stored in an address book or a contact list of the mobile terminal 10.

When the processor determines that the call alert and the message alert have the same identifier, (e.g., phone number) and that second received alert was received within a predetermined time period (e.g., 24 hours) which is determined by the timer 98, the processor 96 causes the volume adjuster 97 to generate an instruction or command to increase or increment a volume level of the ringer 22 by a factor, in this example by a factor of one. The instruction or command generated by the volume adjuster 97 is sent by the processor to the ringer 22, via interface 95 and controller 20. The ringer 22 receives the instruction or command generated by the volume adjuster 37 and increases or increments the volume level by a factor of one (i.e., from (volume level "3" to volume "4"). As such, the message alert (or the call alert) rings with a volume level of "4." The processor 96 determines whether the user of the mobile terminal 10 reads the message alert (or answers the call alert) and if the processor determines that the message alert is not read or unnoticed (or that the call alert was not answered (i.e., missed), the processor causes data to be stored in memory 93 indicating that the message alert (or call alert) was missed.

If the user of the electronic device calls (or sends another message to) the user of the mobile terminal 10 (i.e., a third received alert), data associated with a corresponding call alert (or message alert) is retrieved by processor 96 from receiver 16 and is stored in memory 93 such as the date and time of the call alert (or message alert). The processor determines whether the call alert, (or the message alert) i.e., the third received alert has an identifier (e.g., phone number) that matches an identifier associated with the first and second received alerts.

If the processor determines that the third received alert has an identifier that matches an identifier associated with the first and second received alerts and if the third received alert is received within the predetermined time period (e.g., 24 hours) determined by the timer 98, the processor causes the volume adjuster 37 to generate an instruction or command instructing the ringer 22 to increase or increment a volume level at the ringer by a factor, in this example by a factor of one. This instruction or command is sent to the ringer 22 by processor 96 via interface 95 and controller 20. Upon receipt of the instruction or command generated by the volume adjuster 97, the ringer 22 increases its volume level from "4" to a volume level setting of "5." As such, a ring tone associated with the third received alert, sent from the user of the electronic device, has a ring tone volume that is higher than the second and the first received alerts sent from the user of the electronic device. In this regard, the user of the mobile terminal 10 has a better chance of hearing a ring tone which is beneficial in noisy surroundings and when calls are urgent and important. It should be pointed out that the above process is repeated until a volume level setting of the ringer 22 reaches a maximum volume level setting.

In an analogous manner, when the first, second and third received alerts are rejected (for example, the user of the mobile terminal 10 presses an Ignore, End or Exit key to end an alert notifying the user of a corresponding call alert or a message alert) by the user of the mobile terminal, the volume levels at the ringer 22 may be decreased or decremented each time a received alert is rejected. For instance, in the above example, if the user of the mobile terminal 10 rejects the call alert (or the message alert) i.e., the first received alert by pressing an Ignore key, End key, Exit key or the like (or by any other suitable manner) upon hearing a corresponding ring tone having a volume level of "3," in the above example, the processor stores data in the memory 93 indicating that the first received alert was rejected. As noted above, the processor may determine if the second received alert, i.e., the message alert (or alternatively the call alert) has an identifier (e.g., phone number) that matches an identifier of the first received alert and if the processor determines that the first and second received alerts have a matching identifier and that the second received alert was received within the predetermined time period, (e.g., 24 hours) specified by the timer 98, the processor links or associates the call alert (first received alert) and the message alert (second received alert) and this linkage or association is stored in memory 93.

The processor then causes the volume adjuster 37 to generate an instruction or command instructing the ringer to decrease or decrement a volume level by a predetermined factor, in this example by a factor of one. The processor 96 sends this instruction or command to the ringer 22 which decreases a volume level from "3" to a volume level of "2." As such, the ringer generates a ring tone corresponding to the message alert (or the call alert) i.e., the second received alert having a volume level of "2." The processor 96 determines whether the user of the mobile terminal 10 rejects the message alert (or the call alert) i.e., the second received alert and if so the processor causes the memory 93 to store data indicating that the second received alert was rejected. Furthermore, if the processor determines that the call alert (or the message alert) i.e., the third received alert has an identifier (e.g., phone number) that matches the first and second received alerts that were rejected by the user of the mobile terminal 10 and that the third received alert was received within the predetermined time period, (e.g., 24 hours) the processor 96 links or associates the first, second and third received alerts and causes the memory 93 to store data corresponding to this linkage or association. Simultaneously with the storage of the linkage data in memory 93, the processor causes the volume adjuster 97 to generate an instruction or command instructing the ringer to decrease or decrement a volume level by a predetermined factor, in this example by a factor of one.

This instruction or command, generated by the volume adjuster, is sent by the processor to the ringer via interface 95 and controller 20 and is received by the ringer 22, which decreases the volume level from "2" to a volume level of "1." As such, the ringer 22 generates a ring tone corresponding to the call alert, (or alternatively the message alert) i.e., the third received alert, having a volume corresponding to volume level "2." This process of decreasing or decrementing volume levels at the ringer 22 based on linked call alerts and message alerts that are rejected by the user of the mobile terminal may continue until the lowest volume level setting is reached, in this example a volume level setting of "0."

It should be understood that each block or step of the flowcharts, shown in FIGS. 4 & 5 and combination of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus (e.g., hardware) means for implementing the functions implemented specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the functions specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions that are carried out in the system.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving a first communication from a device;
   causing a received communication alert to be sounded, the received communication alert having an alert volume;
   timing a predetermined time period upon receipt of the first communication;
   determining:
     whether the first communication is missed or not, and
     whether the first communication is rejected or not;
   receiving a second communication from the device within the predetermined time period;
   automatically adjusting, via a processor, the alert volume associated with the second communication to respective levels, in response to the determination revealing that the first communication was missed; and
   automatically adjusting, via the processor, the alert volume associated with the second communication to respective levels, in response to the determination revealing that the first communication was rejected.

2. The method according to claim 1, further comprising:
   receiving one or more other communications from the device; and
   automatically adjusting the alert volume when a previously received one of the one or more communications are missed or rejected within the predetermined time period.

3. The method according to claim 2, wherein prior to the automatically adjusting, determining whether one or more identifiers associated with respective ones of the one or more other communications match a first identifier.

4. The method according to claim 2, wherein the first communication, the second communication and the one or more other communications comprises at least one of a call or a message.

5. The method according to claim 2, wherein the automatically adjusting comprises increasing the alert volume when the determining reveals that the first communication was missed.

6. The method of claim 5, further comprising,
   determining whether the previously received one of the one or more communications is missed or rejected within the predetermined time period and wherein,
   the automatically adjusting comprises increasing the volume to a higher level when the determining reveals that the previously received one of the one or more communications was missed.

7. The method according to claim 2, wherein the automatically adjusting comprises decreasing the alert volume when the determining reveals that the first communication was rejected.

8. The method of claim 7, further comprising,
   determining whether the previously received one of the one or more communications is missed or rejected within the predetermined time period and wherein,
   the automatically adjusting comprises decreasing the volume to a lower level when the determining reveals that the previously received one of the one or more communications was rejected.

9. The method according to claim 1, wherein prior to the automatically adjusting, determining whether a first identifier of the first communication matches a second identifier of the second communication.

10. The method of claim 1, wherein when the determining reveals that the second communication was not missed or was not rejected generating the alerts to comprise a non-adjusted volume.

11. An apparatus comprising:
    at least one processor; and
    at least one memory including computer program code, the at least one memory and the computer program code configured to, with the at least one processor, cause the apparatus to perform at least the following:
      receive a first communication from a device;
      cause a received communication alert to be sounded, the received communication alert having an alert volume;
      time a predetermined time period upon receipt of the first communication;
    determine
      whether the first communication is missed or not, and
      whether the first communication is rejected or not;
      receive a second communication from the device within the predetermined time period;
      automatically adjust the alert volume; associated with the second communication to respective levels, in response to determination revealing that the first communication was missed; and
      automatically adjust the alert volume associated with the second communication to respective levels, in response to the determination revealing that the first communication was rejected.

12. The apparatus of claim 11, wherein the alert volume comprises one or more level settings and wherein a lowest level setting among the one or more level settings comprises a silent mode which vibrates the apparatus corresponding to a first alert and wherein a highest level among the one or more levels corresponds to a highest volume.

13. The apparatus of claim 12, wherein the at least one memory and the computer program code are further configured to, with the at least one processor, cause the apparatus to:
enable a user setting selected by a user, the user setting comprises a command enabling a change to the lowest level setting which comprises the silent mode, to at least one higher level setting among the one or more level settings upon receipt of the second communication; and
determine whether the alert volume comprises the lowest level setting and wherein in response to a determination that the alert volume comprises the lowest level setting, automatically adjust the alert volume by switching the lowest level setting to at least one higher level setting which enables a first alert to comprise a ring tone.

14. The apparatus of claim 11, wherein the at least one memory and the computer program code are further configured to, with the at least one processor, cause the apparatus to:
receive one or more other communications from the device; and
automatically adjust the alert volume when a previously received one of the one or more communications are missed or rejected with the predetermined time period.

15. The apparatus of claim 14, wherein the at least one memory and the computer program code are further configured to, with the at least one processor, cause the apparatus to:
determine whether one or more identifiers associated with respective ones of the one or more other communications match a first identifier.

16. The apparatus of claim 14, wherein the at least one memory and the computer program code are further configured to, with the at least one processor, cause the apparatus to:
automatically adjust the alert volume by increasing the alert volume in response to a determination that the first communication was missed.

17. The apparatus of claim 16, wherein the at least one memory and the computer program code are further configured to, with the at least one processor, cause the apparatus to:
determine whether the previously received one of the one or more communications is missed or rejected within the predetermined time period; and
automatically adjust the alert volume by increasing the alert volume to a higher level in response to a determination that the previously received one of the one or more communications was missed.

18. The apparatus of claim 14, wherein the at least one memory and the computer program code are further configured to, with the at least one processor, cause the apparatus to:
automatically adjust the alert volume by decreasing the alert volume in response to a determination that the first communication was rejected.

19. The apparatus of claim 18, wherein the at least one memory and the computer program code are further configured to, with the at least one processor, cause the apparatus to:
determine whether the previously received one of the one or more communications is missed or rejected within the predetermined time period; and
automatically adjust the alert volume by decreasing the volume to a lower level in response to a determination that the previously received one of the one or more communications was rejected.

20. The apparatus of claim 14, wherein the first and second communications and the one or more other communications comprises at least one of a call or a message.

21. The apparatus of claim 20, wherein the at least one memory and the computer program code are further configured to, with the at least one processor, cause the apparatus to:
enable a user setting selected by a user of the apparatus; and
link corresponding ones of the call with corresponding ones of the message to each other based upon a common identifier of the call and the message.

22. The apparatus of claim 21, wherein the first communication comprises the call and the second communication comprises the message.

23. The apparatus of claim 20, wherein the call comprises a telephone call and wherein the message comprises at least one of a short message service (SMS) message, a text message, a multimedia message service (MMS) message or an e-mail message.

24. The apparatus of claim 14, wherein the at least one memory and the computer program code are further configured to, with the at least one processor, cause the apparatus to:
enable a user setting selected by a user, the user setting comprises a command enabling a change to the lowest level setting which comprises the silent mode, to at least one higher level setting among the one or more level settings upon receipt of the second communication; and
determine whether the alert volume comprises the lowest level setting and wherein in response to a determination that the volume comprises the lowest level setting, automatically adjust the volume by switching the lowest level setting to at least one higher level setting which enables a second alert to comprise a ring tone.

25. The apparatus of claim 11, wherein the at least one memory and the computer program code are further configured to, with the at least one processor, cause the apparatus to:
determine whether a first identifier of the first communication matches a second identifier of the second communication.

26. The apparatus of claim 25, wherein the first and second identifiers correspond to at least one of a phone number, an address of a user, a name of a user and an e-mail address of a user.

27. The apparatus of claim 11, wherein the apparatus comprises a personal computer, a laptop computer, a mobile phone or a personal digital assistant.

28. A computer program product, the computer program product comprising at least one non-transitory computer-readable storage medium having computer-readable program code portions stored therein, the computer-readable program code portions comprising:
a first executable portion for enabling the sounding of a received communication alert, the received communication alert having an alert volume;
a second executable portion for receiving a first communication from a device;
a third executable portion for timing a predetermined time period upon receipt of the first communication;
a fourth executable portion for determining
whether the first communication is missed or not, and
whether the first communication is rejected or not;
a fifth executable portion for receiving a second communication from the device within the predetermined time period;
a sixth executable portion for automatically adjusting the alert volume associated with the second communication to respective levels, in response to the determination revealing that the first communication was missed; and
a seventh executable portion for automatically adjusting the alert volume associated with the second communication to respective levels, in response to the determination revealing that the first communication was rejected.

29. The computer program product according to claim 28, further comprising:

a seventh executable portion for receiving one or more other communications from the device; and an eighth executable portion for automatically adjusting the alert volume of a second alert corresponding to a currently received one of the one or more other communications when a previously received one of the one or more communications are missed or rejected within the predetermined time period.

30. An apparatus comprising:

a means for causing a received communication alert to be sounded, the received communication alert having an alert volume;

a means for receiving a first communication from a device;

a means for timing a predetermined time period upon receipt of the first communication;

a means for determining
whether the first communication is missed or not, and
whether the first communication is rejected or not;

a means for receiving a second communication from the device within the predetermined time period;

a means for automatically adjusting the alert volume associated with the second communication to respective levels, in response to the determination that the first communication was missed; and a means for automatically adjusting the alert volume associated with the second communication to respective levels in response to the determination revealing that the first communication was rejected.

* * * * *

UNITED STATES PATENT AND TRADEMARK OFFICE
CERTIFICATE OF CORRECTION

| | | |
|---|---|---|
| PATENT NO. | : 8,116,826 B2 | Page 1 of 1 |
| APPLICATION NO. | : 11/771469 | |
| DATED | : February 14, 2012 | |
| INVENTOR(S) | : Kraft et al. | |

It is certified that error appears in the above-identified patent and that said Letters Patent is hereby corrected as shown below:

Column 4
Line 18, "convolutionally and interleave" should read --convolutionally encode and interleave--.

Column 14
Line 44, "(or is adjusted of a" should read --(or is adjusted to a--.

Column 20
Line 54, "volume;" should read "volume".
Line 56, "response to determination" should read --response to the determination--.

Signed and Sealed this
Twenty-seventh Day of November, 2012

David J. Kappos
*Director of the United States Patent and Trademark Office*